United States Patent [19]
Kjærulff et al.

[11] Patent Number: 5,881,638
[45] Date of Patent: Mar. 16, 1999

[54] PLANT FOR TREATING FOODSTUFFS

[75] Inventors: Gorm Bro Kjærulff, Videbæk; Ole Poulsen, Herning, both of Denmark

[73] Assignee: APV Pasilac A/S, Arhus C, Denmark

[21] Appl. No.: 849,111

[22] PCT Filed: Nov. 14, 1995

[86] PCT No.: PCT/DK95/00452

§ 371 Date: May 28, 1997

§ 102(e) Date: May 28, 1997

[87] PCT Pub. No.: WO96/16556

PCT Pub. Date: Jun. 6, 1996

[30] Foreign Application Priority Data

Nov. 28, 1994 [DK] Denmark ............................ 1354/94

[51] Int. Cl.[6] .............................. A23C 3/02; A23C 3/037; A23L 3/00
[52] U.S. Cl. ................................ 99/453; 99/452; 99/454; 99/472; 99/483; 99/516
[58] Field of Search ...................... 99/470, 472, 452–455, 99/459, 456, 460, 483, 487, 516; 426/231, 491, 582, 580, 587, 510, 511, 32, 34, 42–44; 422/307, 300, 302–305, 209, 292, 100, 102, 104, 186

[56] References Cited

U.S. PATENT DOCUMENTS

| | | | |
|---|---|---|---|
| 3,896,716 | 7/1975 | Carasso | 99/452 |
| 4,253,386 | 3/1981 | Egnell | 99/453 |
| 4,310,476 | 1/1982 | Nahra et al. | 99/483 X |
| 5,443,857 | 8/1995 | Arph et al. | 99/454 X |
| 5,470,595 | 11/1995 | Kopp et al. | 426/231 |
| 5,591,469 | 1/1997 | Zettier | 99/452 X |
| 5,683,733 | 11/1997 | Krabsen et al. | 426/491 |

FOREIGN PATENT DOCUMENTS 0 617 897  3/1994  European Pat. Off.

*Primary Examiner*—Timothy F. Simone
*Attorney, Agent, or Firm*—McDermott, Will & Emery

[57] ABSTRACT

A plant for treating heat-sensitive fluid foodstuffs, such as whey protein concentrate and cheese milk, is provided. The plant comprises: an infusion chamber having an outlet opening, in which the fluid foodstuff is subjected to a heat treatment by a feeding of steam therein; a vacuum chamber having an inlet opening in communication with the infusion chamber for removing water from the fluid foodstuff; and a positive-displacement pump connected to the outlet opening of the infusion chamber and connected to the inlet opening of the vacuum chamber in such a manner that during operation of the plant a pressure drop applies across the pump in the flow direction of the fluid.

5 Claims, 2 Drawing Sheets

PLANT FOR TREATING FOODSTUFFS

FIELD OF THE INVENTION

The invention relates to a plant for treating heat-sensitive fluid foodstuffs, such as whey protein concentrate and cheese milk, said plant comprising an infusion chamber in which the fluid is heat treated by way of a supply of steam, and a vacuum chamber connected thereto for the removal of water from the fluid.

DESCRIPTION OF PRIOR ART

Inter alia AU-PS No. 610,233 discloses a plant for sterilizing milk. Such a plant is known as a direct UHT plant (ultra high Temperature). In these plants, steam is sprayed into milk which is fed to an infusion chamber in such a manner that the milk is heated to a temperature of approximately 140° C. Subsequently, the milk is fed to a so-called holding chamber in which the milk is kept for a predetermined period (approximately 2 to 15 sec) in the heated state. Then the milk is carried to a vacuum chamber in which the water deriving from the steam is removed in such a manner that the solid content of the milk is the same when the milk leaves said vacuum chamber as before the feeding of steam. After the processing in the vacuum chamber, the milk is usually carried to a homogenizer and then subjected to a cooling and packing.

Furthermore the above holding chamber is known to comprise a centrifugal pump, which is connected to the outlet of the infusion chamber through a tube, and pumps the heated milk into a length of tube extending through an expansion valve to the vacuum chamber. In this manner a quick transfer is ensured of the heated milk to the length of tube between the pump and the expansion valve, where, as mentioned, the actual sterilizing process is performed in a few seconds in the heated state before the temperature drops quickly after the passing of the expansion valve.

When it is a question of fluids being more heat-sensitive than ordinary milk, and of products having a lower pH-value (less than 6.6) than ordinary milk, a tendency of the fluid burning onto the sides in contact with the fluid applies; as a result, the plant processing such fluids must be cleaned in a short period of use. When the above plant for treating for instance whey protein concentrate (WPC) at temperatures suited for this fluid, the processing period is typically less than 30 minutes.

Usually, the fluids in question are subjected to a heat treatment in order to remove bacteria and spores but to minimize the destruction of, inter alia, proteins and vitamins. When the holding time at a predetermined temperature is shortened, the occurrence of chemical changes or destructions of useful ingredients relative to the killing of bacteria are considerably reduced. Therefore the temperature can advantageously be raised in connection with heat-sensitive products at the same time as the holding time is shortened.

Previously, the heat-sensitive fluids were conventionally subjected to a heat treatment in plate heat exchangers, but a demand for raising the treatment temperature while simultaneously shortening the holding time at the high temperature has resulted in the use of such plate heat exchangers no longer being advantageous.

SUMMARY OF THE INVENTION

An object of the invention is to provide a plant suited for a continuous heat treatment of heat-sensitive fluids or fluid foodstuffs involving a long processing period.

The plant according to the invention is characterised in that the inlet opening of the infusion chamber is directly connected to the inlet of a positive-displacement pump, and that the outlet of the positive-displacement pump is connected to the inlet of the vacuum chamber in such a manner that a pressure drop applies across said pump when seen in the flow direction of the fluid during the running of the plant.

The resulting plant allows an increase of the treatment temperature and a correspondingly short stay period at the temperature in question. The latter is in particular due to the fact that a positive-displacement pump accommodated directly at the outlet of the infusion chamber ensures an instantaneous and fast removal of the heated fluid from said infusion chamber into an area with a lower pressure and consequently a fast drop in temperature. As a result, the fluid in question is subjected to the high temperature for a very short period, and further the fluid's falling period inside the infusion chamber being approximately 0.1 sec. In addition, the pump ensures that the temperature drops again quickly. The pressure after the pump, when seen in the flow direction of the fluid, is kept at a relatively low level due to the direct connection with the vacuum chamber. As the bottom of the infusion chamber has been cooled, the temperature of the fluid drops abruptly when said fluid reaches the bottom of said infusion chamber. The use of a positive-displacement pump implies, furthermore, that co-operating surfaces are automatically kept clean of possible burnings, and accordingly the processing period is relatively long despite the high processing temperatures.

It is particularly preferred that the positive-displacement pump is a gear pump, because such a pump ensures a mutual self-purifying rubbing of almost all the surfaces coming into contact with the fluid.

Furthermore, the housing of the positive-displacement pump may, according to the invention, be cooled with the result that the fluid being directly fed into the pump, without having been in contact with the bottom of the infusion chamber, is quickly cooled too.

BRIEF DESCRIPTION OF THE DRAWING

The invention is explained in greater detail below with reference to the accompanying drawing.

BEST MODE FOR CARRYING OUT THE INVENTION

Figure 1:
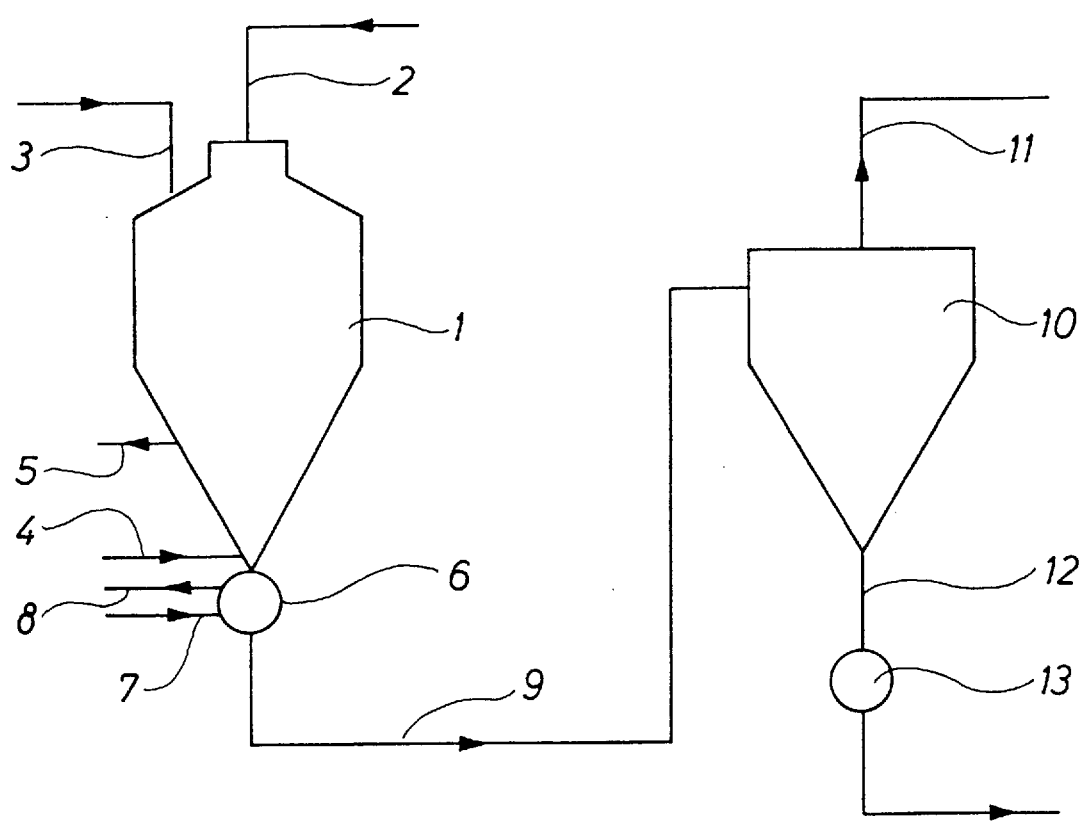
FIG. 1 is a diagrammatic view of a plant according to the invention.

The plant of FIG. 1 comprises an infusion chamber 1 of a conventionally known type. The infusion chamber is connected to a tube 2 for feeding fluid to be heat treated inside said infusion chamber 1, and a tube 3 for the feeding of steam. Finally, the infusion chamber is connected to tubes 4 and 5 for feeding and removing liquid for cooling the bottom of infusion chamber 1. The outlet of infusion chamber 1 is directly connected to a gear pump, the housing of which, gear pump is cooled by means of coolant fed and removed through tubes 7 and 8 respectively. The outlet of the gear pump is connected to the inlet of a vacuum chamber 10 of a conventionally known type through a tube 9. This vacuum chamber is adapted to remove the amount of water originally supplied in the form of steam in the infusion chamber through tube 11 of the vacuum chamber, and whereas the concentrated fluid is drained off through tube 12 and a pump 13 in a conventionally known manner.

Figure 2:
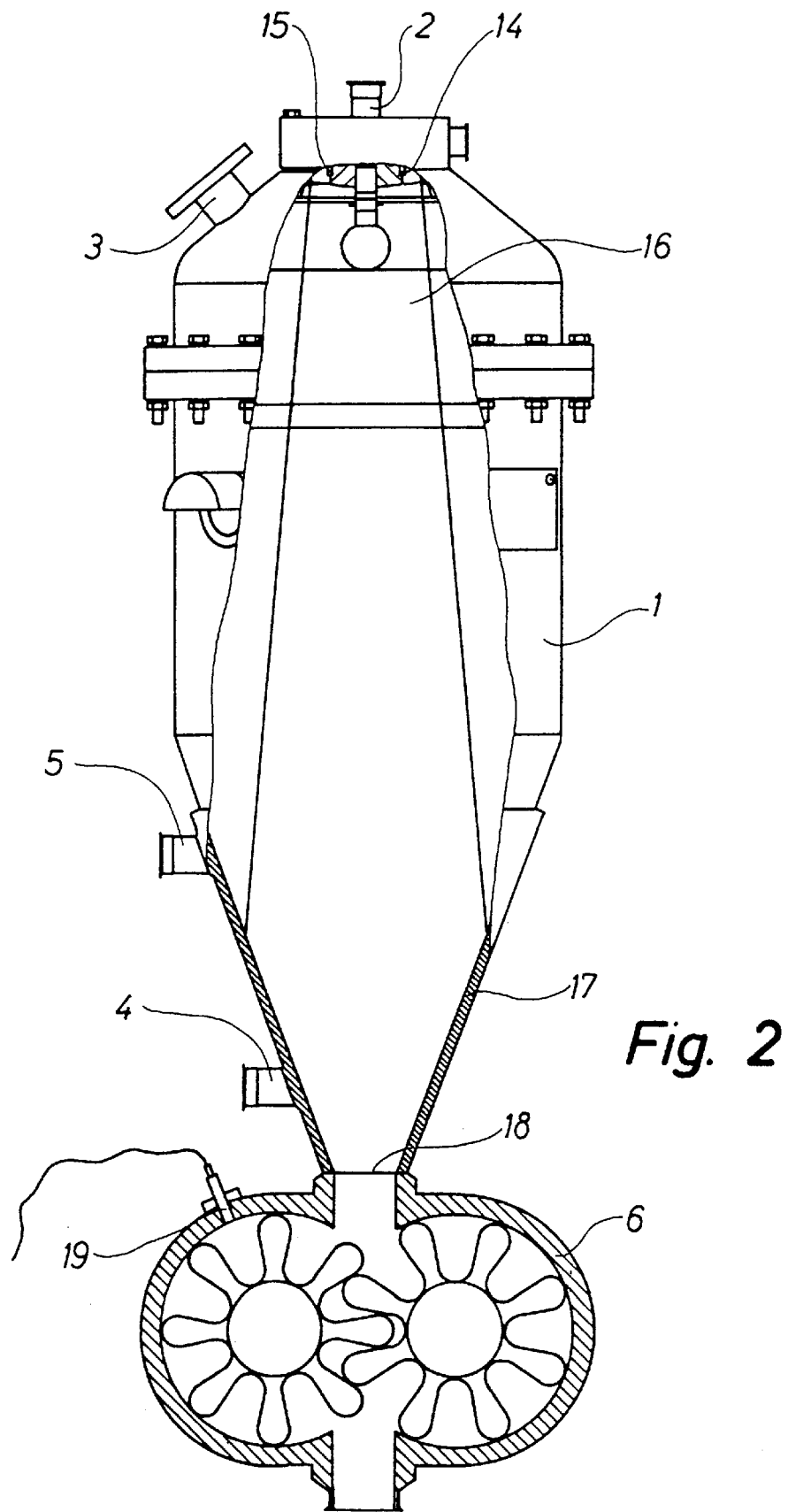
FIG. 2 is a diagrammatic view of an infusion chamber of the plant of FIG. 1, whereby parts have been removed for the sake of clarity, and whereby said infusion chamber is connected to a gear pump.

FIG. 2 is a diagrammatic view of infusion chamber 1, whereby parts have been removed for the sake of clarity, and whereby it is connected to gear pump 6. The fluid to be treated is carried through tube 2 into infusion chamber 1, said fluid entering infusion chamber 1 in separate jets through a plurality of outlet openings 14 and 15 and meeting hot steam. The hot steam is injected through a circumferential steam distribution chamber 16 in the same manner as described in the above AU-PS No. 610,233. A cooling jacket 17 is provided around the bottom of chamber 1, said jacket keeping the bottom of the infusion chamber cooled.

The gear pump is of a conventionally known type and is connected to the outlet 18 of the infusion chamber, and the housing of the gear pump is connected to temperature sensor 19 at a location where the adjacent surface is kept clean of burnings by means of the teeth of the gear wheels. In this manner it is possible to ensure a reliable control of the plant.

The plant can be used for treating various heat-sensitive products, and the temperatures in question are adapted to the individual product. The plant can for instance be used for heat treatment of whey protein concentrate (WPC), which is a product with a high content of whey protein and which, inter alia, is used for the production of babyfood. Whey protein concentrate usually contains 70% of water and 30% of solid matter, of which 20% are whey protein. Ordinary milk contains approximately 0.1% of whey protein. Usually, whey protein concentrate has been treated by means of a plate heat exchanger at 68° C. for 15 sec. In this manner, a 20% whey protein denaturation is obtained. When the plant according to the invention is used, the whey protein concentrate is carried through the plant while the temperature is controlled, and when the maximum whey protein denaturation is set to 20%, the heat treatment temperature was kept at 75°–85° C. for a holding time of ½sec. at this high temperature. As a result, the content of bacteria and spores was considerably reduced.

The plant can advantageously also be used for treatment of cheese milk, which is ordinary milk to be used for the production of cheese. Cheese milk contains, inter alia, milk lipase which is an enzyme being destroyed by a conventional low pasteurization. It is in connection with some cheeses, such as Feta cheeses and other Southern types of cheese, that the milk lipase is disadvantageously destroyed because it is then necessary to add lipase again after the treatment. Another type of cheese is Roquefort. In order to maintain the content of milk lipase in the cheese milk it has previously been necessary not to go beyond a mild heat treatment below 70° C., i.e. below the low pasteurization temperature. As these treatments did not involve a satisfying destruction of the bacteria, an advantage is found in a treatment at higher temperatures.

The degree of killing or removal of the bacteria is usually measured by measuring the content of alkaline phosphatase enzyme, as said enzyme should preferably be totally removed. The very fact that the holding time is minimized and that the heat treatment temperature is raised to approximately 85° C. in the described plant have the effect that the alkaline phosphatase enzyme is almost completely destroyed while only a minor quantity of the milk lipase is destroyed.

The content in ordinary milk of alkaline phosphatase enzyme is denatured completely by a low pasteurization, i.e. by a stay at 72° C. for 15 sec. By the use of the plant according to the invention the following results were obtained.

| Test | | $\mu$g phenole/ml milk* |
|---|---|---|
| Raw milk | | 2300.0 |
| Heat treatment | 81.0° C. | 23.9 |
| " | 81.5° C. | 10.9 |
| " | 82.0° C. | 8.6 |

-continued

| Test | | $\mu$g phenole/ml milk* |
|---|---|---|
| " | 82.5° C. | 8.4 |
| " | 83.0° C. | 4.6 |
| " | 83.5° C. | 3.9 |
| " | 84.0° C. | 2.2 |
| " | 84.5° C. | <1.0 |
| " | 85.0° C. | <1.0 |

*The amount of phenole is directly proportional to the amount of phosphatase enzyme.

The results show that the denaturation of the phosphatase enzyme depends very little on the heat treatment temperature because the holding time is ultrashort and very accurate. In this manner it is ensured that all particles are subjected to the same heat treatment.

In other words, the use of the plant according to the invention involves a very insignificant chemical destruction of the vital enzymes in the product in question due to the very short holding time. At the same time the effect of the heat treatment on the taste and appearance of the product is minimized. The destruction of the content of vitamins and protein in the product has also been minimized. In addition, a relatively high degree of removal of bacteria has been allowed compared to the removal of bacteria obtained by heat treatment by means of a plate heat exchanger. During the operation of the plant according to the invention, the product in question is never in contact with heating surfaces, and the heat precipitations are extremely limited. The described plant renders it possible to obtain a very accurate control of the holding time because the speed profile of the product during its free fall inside chamber 1 is relatively flat and because the temperature is abruptly reduced when meeting the bottom and the pump.

During the following vacuum treatment, water, air, and volatile aromatics optionally causing an unpleasant taste in the product are removed. As the air is removed from the product, said product is also very storable.

The invention has been described with reference to a preferred embodiment. Many modifications can be carried out without thereby deviating from the scope of the invention. Other positive-displacement pumps beyond the described gear pump can, for instance, be used.

What is claimed is:

1. A plant for treating heat-sensitive fluid foodstuffs, said plant comprising:

an infusion chamber for receiving the fluid and for steam-heating the fluid by feeding steam to the fluid in the chamber, wherein the infusion chamber includes an outlet opening;

a vacuum chamber having an inlet opening in communication with the infusion chamber for removing water from the fluid; and a positive-displacement pump directly connected to the outlet opening of the infusion chamber and connected to the inlet opening of the vacuum chamber for passing the fluid from the infusion chamber to the vacuum chamber so that a pressure drop applies from the infusion chamber to the vacuum chamber.

2. A plant as claimed in claim 1, wherein the positive-displacement pump is a gear pump.

3. A plant as claimed in claim 1, wherein the positive displacement pump further comprises a housing.

4. A plant as claimed in claim 3, wherein the housing of the positive-displacement pump is cooled.

5. A plant as claimed in claim 3, wherein the positive-displacement pump further comprises a temperature sensor disposed in the housing.

* * * * *